United States Patent [19]
Guerrero et al.

[11] 4,416,074
[45] Nov. 22, 1983

[54] RING VIEWER

[75] Inventors: Benjamin G. Guerrero, Los Angeles; Saint Elmo B. Berford, Lakewood, both of Calif.

[73] Assignee: Mattel, Inc., Hawthorne, Calif.

[21] Appl. No.: 426,464

[22] Filed: Sep. 29, 1982

[51] Int. Cl.³ .............................................. G02B 27/02
[52] U.S. Cl. ...................... 40/364; 40/10 D; 63/1 R; 63/23
[58] Field of Search ............... 40/363, 361, 362, 365, 40/364; 63/23, 1 R, 15

[56] References Cited

U.S. PATENT DOCUMENTS

| | | | |
|---|---|---|---|
| 33,031 | 8/1861 | Dagron | 63/23 |
| 203,323 | 5/1878 | Closson | 63/1 R |
| 507,529 | 10/1893 | Doe | 40/364 |
| 1,333,284 | 3/1920 | Schreiber | 40/16 X |
| 1,487,173 | 3/1924 | Manion | 40/364 |
| 1,586,606 | 6/1926 | Cain | 63/1 R |
| 2,129,759 | 9/1938 | Goldman | 40/364 |
| 2,520,410 | 8/1950 | Jelinek | 40/364 |
| 2,570,913 | 10/1951 | Brown | 40/363 |
| 2,668,369 | 2/1954 | Hepp | 63/1 R |
| 3,321,934 | 5/1967 | Boyd | 63/1 R |

*Primary Examiner*—Gene Mancene
*Assistant Examiner*—Wenceslao J. Contreras
*Attorney, Agent, or Firm*—Ronald M. Goldman; Max E. Shirk; James G. O'Neill

[57] ABSTRACT

A finger ring is provided with an endless strip of film held in a track formed within the ring. The ring includes a lens for viewing the film, a light transmitting system to apply light to the film and a film advance mechanism for moving the film a predetermined distance each time the advance mechanism is actuated.

6 Claims, 4 Drawing Figures

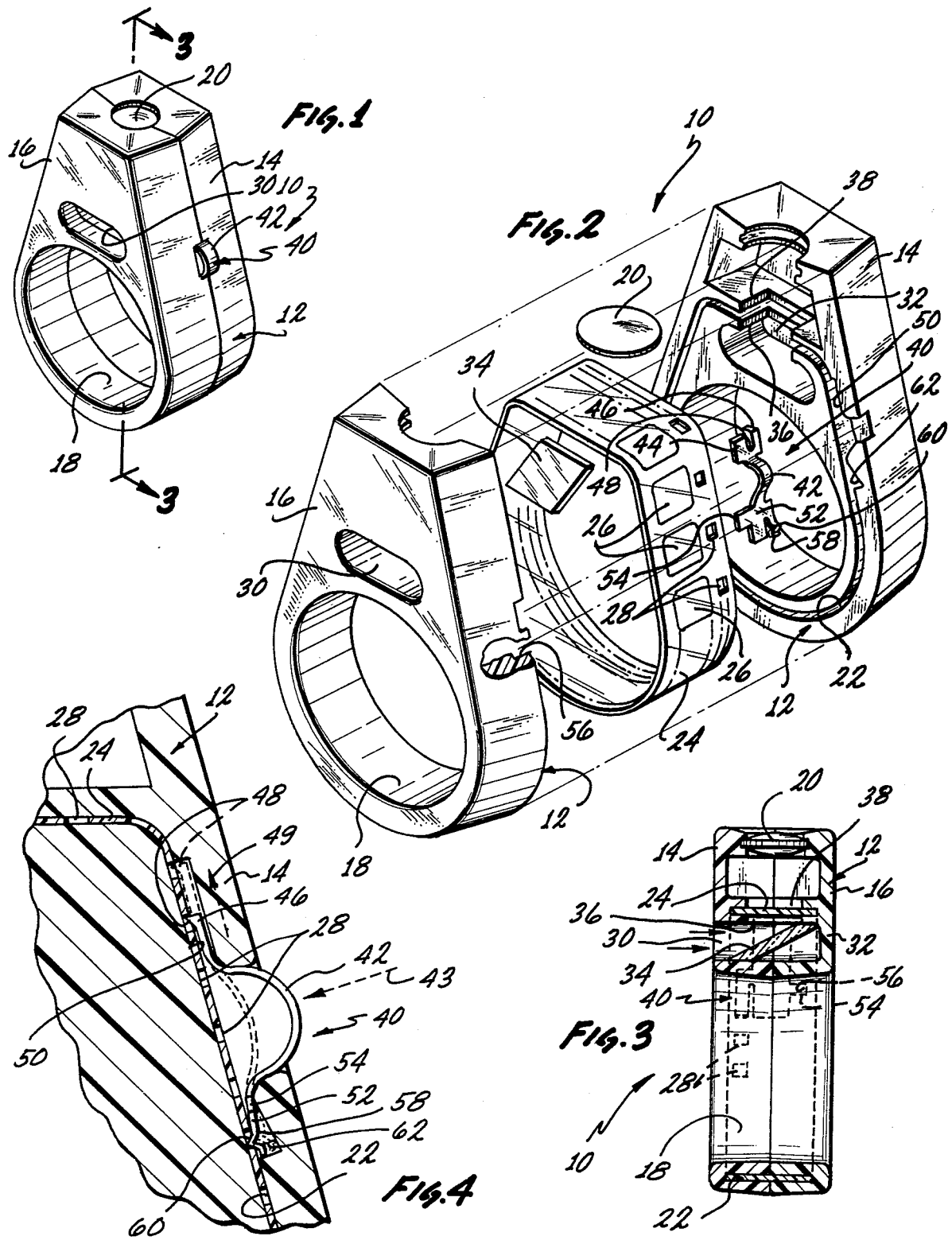

RING VIEWER

BACKGROUND OF THE INVENTION

1. Field of the Invention

This invention pertains generally to the field of film viewers and more particularly to a new and useful ring viewer having a continuous strip of film housed within the ring that may be moved a frame at a time to be viewed through a lens held in the ring.

2. Brief Description of the Prior Art

Prior art known to applicants comprises the following U.S. patents:

| Patentee | U.S. Pat. No. | Date Issued |
| --- | --- | --- |
| Cain | 1,586,606 | June 1, 1926 |
| Goldman | 2,129,759 | Sept. 13, 1938 |
| Jelinek | 2,520,410 | Aug. 29, 1950 |
| Brown | 2,570,913 | Oct. 9, 1951 |
| Hepp | 2,668,369 | Feb. 9, 1954 |
| Lazarus, et al. | 3,887,270 | June 3, 1975 |

Cain discloses a ring having inner and outer annular sections which may be adjusted with respect to each other to cover or uncover a mirror held on the inner annular section.

Goldman discloses a hand-held film viewer having a lens at one end of a casing and a film holder at the other end to allow a strip of film to be passed over a sight opening.

Jelinek discloses a film viewing device in which an endless strip of film is mechanically driven around a track to pass a lens equipped eyepiece. Light is allowed to pass through the film to the eyepiece via an opening formed in the casing holding the film track on the side opposite the eyepiece.

Brown discloses a toy film viewer utilizing film discs and a lens system to view the film.

Hepp discloses a bracelet which contains a number of openings for showing ciphers, one at a time, contained on endless bands held within the bracelet.

Lazarus, et al., discloses a stylus device for viewing a sequence of images. One end of the stylus is equipped with a rotatable translucent tubular member having a lens at one end and a number of photographic images arranged in a ring within the tubular member. A mirror is held at a 45° angle within the tubular member near the photographic images and allows a user to see different images in the mirror, through the eyepiece, as the translucent tubular member is turned.

None of the prior art devices discloses a simple and inexpensive ring viewer, and in particular, a ring viewer having an endless strip of film sealed inside thereof. Nor do they disclose a ring viewer in which sequential images may be viewed through a lens mounted within the ring, by action of an uncomplicated advance mechanism held within the ring.

SUMMARY OF THE INVENTION

This invention is directed, in brief, to the provision of a new and useful ring viewer.

The best mode currently contemplated by applicants for carrying out the invention includes the provision of a sealed housing having a track formed therein. A lens is held in the housing in position where a ring setting would normally appear to allow a user to look through the lens and view an image or series of images, one frame at a time, formed on an endless strip of film captured within the track. The housing includes an opening to allow light into the housing and to be passed through the film by means of a mirror held within the housing.

Additionally, a mechanical advance switch is held within the housing to allow the film strip to be advanced, in one direction, one frame at a time.

The features of the present invention which are believed to be novel are set forth with particularity in the appended claims. The present invention, both as to its organization and manner of use, together with further objects and advantages thereof, may best be understood by reference to the following description, taken in connection with the accompanying drawing in which like reference characters refer to like elements in the several views.

BRIEF DESCRIPTION OF THE DRAWING

FIG. 1 is a perspective view of a ring viewer constituting a presently-preferred embodiment of the invention;

FIG. 2 is an exploded perspective view of the ring of FIG. 1;

FIG. 3 is a cross-sectional view taken along line 3—3 of FIG. 1; and

FIG. 4 is an enlarged partial cross-sectional view showing the film advance mechanism.

DESCRIPTION OF THE PREFERRED EMBODIMENT

Referring again to the drawing, a ring viewer constituting a presently-preferred embodiment of the invention, generally designated 10, is shown for purposes of illustration, but not of limitation, having a housing 12, with two halves 14, 16 fixedly held together. The housing 12 is preferrably made from a suitable polymeric material such as an ABS, with the two halves permanently sonic welded together.

The housing includes a generally circular finger opening 18 formed in an enlarged lower portion of each half to allow the finger of a wearer to be inserted into the ring. In addition, the upper portion of the housing is preferrably smaller and may contain a design or decorative material thereon and includes a lens 20 formed integrally with or captured between the two halves.

As is shown more clearly in FIGS. 2 and 4, one half of a track 22 is formed internally in each of the two housing halves. An endless film 24 having a number of images or frames 26 thereon, together with corresponding perforations 28 in aligned relationship therewith is moveably held within the track.

An aperature or opening 30 is formed in the housing and extends entirely through one half of the housing, such as the left half 16 shown in FIGS. 1-3 and through the other half, such as the right half 14 until it ends at a solid wall 32, shown in FIG. 3. If desired, the aperture 30 could be eliminated and the entire ring or selected portions thereof, could be made from transparent or translucent material to allow light to pass therethrough.

The light entering the aperture 30 or through the transparent or translucent material of the ring impinges upon a mirror or reflecting surface 34 fixedly held within the aperture at a predetermined angle. The mirror reflects the light through an aligned opening 36 between the track 22 and aperture 30, through the image or frame on the film overlaying the opening 36 and through a further aligned opening 38 to thereby allow the lighted image to be viewed through the lens 20.

The housing further includes a film advance mechanism 40 consisting of a one piece element made from a resilient material, such a polyethylene. It is operated by pressing against a raised central portion 42, in the direction of the arrow 43. This forces the raised portion down and into the ring, as shown in phantom line in FIG. 4, to thereby slide a front section 44, including a leaf spring 46 having a front dog 48, forward within an enlarged protion 50, of the track 22. The front dog 48 acts in one of the performations 28 of the film to move the film strip forward one frame, in the direction of the broken arrow 49, as shown in FIG. 4.

The advance mechanism also includes a rear section 52 which does not move when pressure is applied to the central portion 42, since it is held in place by a lug 54 held in a corresponding opening 56 formed in the left housing 16. The rear section 52 also includes a leaf spring 58 having a slightly different shaped rear dog 60 which prevents the film from being moved backwards when the pressure is released from the raised portion and the front dog moves back to its rest position due to the natural relience of the material. The rear dog 60 is cammed upwardly, into an enlarged area 62 of track 28, as shown in phantom line in FIG. 4, during the advance of the film.

OPERATION

The ring viewer is used either worn on the finger of a wearer or taken off the finger. The ring viewer is held in front of a light souce which allows light into the interior of the ring where the reflecting surface passes the light through the film. The viewer is then able to see the portion of the film through which the light passes on the lens. The film within the sealed ring is advanced, one image or frame at a time by operating the advance mechanism located at the side of the ring. In this manner the viewer may see the entire film contained in the ring, a frame at a time.

While the particular ring viewer herein shown and described in detail is fully capable of attaining the objects and providing the advantages hereinabove stated, it is to be understood that it is merely illustrative of the presently-preferred embodiment of the invention and that no limitations are intended to the details of construction or design herein shown other than as defined in the appended claims.

Whenever the term "means" is employed in these claims, this term is to be interpreted as defining the corresponding structure illustrated and described in the specification or the equivalent of the same.

What is claimed is:

1. A ring viewer comprising:
   a housing consisting of two halves permanently sealed together, said housing including a substantially circular track formed integrally between said halves, a lens held in said housing in a position overlying said track, and a finger opening adapted to accommodate the finger of a wearer extending entirely through said housing and being surrounded by said track;
   an endless strip of film having a number of frames and corresponding perforations thereon moveably held in said track;
   a reflecting means mounted at an angle in said housing between said opening and said track in alignment with said lens and further openings formed in said housing above and below said film; and
   means in said housing to allow light to pass into said housing whereby said light will impinge on said reflecting means to pass through said further opening below said film, said further opening above said film and said lens to allow one of said frames on said film to be seen by a viewer.

2. The ring viewer of claim 1, further including a film advance mechanism mounted in said ring and cooperating with performations formed in said film to advance said film one frame at a time.

3. The ring viewer of claim 2 wherein said film advance mechanism comprises a single piece of resilient material, including an operating button, a front driving dog, and a rear stop dog to allow said film to be advanced in one direction only upon pressing on said button with sufficient force.

4. The ring viewer of claim 3 wherein said operating button is capable of being pushed into said ring from its rest position, said rear stop dog is fixed in said housing against movement along said track, and said front driving dog, when pressure is applied against said operating button to push said button into said ring, slides along on enlarged portion in said track, a predetermined distance, to advance said film one frame, and wherein said natural resilience of said advance mechanism will return said operating button and said front driving dog to their rest positions when said pressure is released from said button.

5. The ring viewer of claims 1, 2, 3, or 4 wherein said reflecting means in said housing is a mirror and said means to allow light to pass into said housing comprises an aperture passing through said housing and in alignment with said mirror.

6. A ring viewer comprising:
   two molded housing halves permanently welded together to form a ring housing;
   a finger opening formed in said housing adapted to accommodate the finger of a wearer;
   a track formed internally of said housing between said housing halves and surrounding said finger opening;
   an endless strip of film having a number of frames and corresponding perforations thereon moveably captured in said track;
   a light aperture formed in said housing, said light aperture extending entirely through one of said housing halves and being closed by a wall in said other housing half;
   a mirror mounted at a preselected angle in said light aperture to reflect light received from a light source;
   a lens captured between said housing halves and aligned with said mirror;
   two film openings formed in said housing in alignment with said lens and said mirror on either side of said track to allow said light reflected by said mirror to pass through a frame of said film to be seen by a viewer on said lens; and
   a unitary film advance mechanism held in said ring adjacent said film including means to move said film a frame at a time upon application of pressure thereto.

* * * * *